United States Patent
Coleman

[15] 3,666,730
[45] May 30, 1972

[54] OIL-SOLUBLE INTERPOLYMERS OF N-VINYLTHIOPYRROLIDONES

[72] Inventor: Lester E. Coleman, Cleveland, Ohio
[73] Assignee: The Lubrizol Corporation, Wickliffe, Ohio
[22] Filed: Feb. 10, 1970
[21] Appl. No.: 14,887

Related U.S. Application Data

[60] Division of Ser. No. 742,517, July 5, 1968, Pat. No. 3,519,565, which is a continuation-in-part of Ser. No. 668,958, Sept. 19, 1967, abandoned.

[52] U.S. Cl..................260/78.5 B, 260/63 N, 260/79.7, 260/80.72, 260/80.73, 260/80.8, 260/86.1 N
[51] Int. Cl.........................................C08f 19/00, C08f 41/00
[58] Field of Search..................260/78.5 B, 78.5 E, 80.72, 260/80.73, 80.8, 86.1 N, 79.7, 63, 77

[56] References Cited

UNITED STATES PATENTS

| | | | |
|---|---|---|---|
| 3,142,664 | 7/1964 | Bauer | 260/80.72 |
| 3,405,084 | 9/1968 | Bohacetal | 260/29.6 |

*Primary Examiner*—Joseph L. Schofer
*Assistant Examiner*—John Kight, III
*Attorney*—Roger Y. K. Hsu, William H. Pittman and James W. Adams, Jr.

[57] ABSTRACT

N-Vinylthiopyrrolidone, and its lower alkyl-substituted homologs, are interpolymerized with polymerizable alkyl ($C_s$ or greater) carboxylates and (optionally) other oxygen-containing monomers to produce oil-soluble polymers. These polymers are useful in lubricating oils as viscosity index improvers, dispersants and oxidation inhibitors.

7 Claims, No Drawings

OIL-SOLUBLE INTERPOLYMERS OF N-VINYLTHIOPYRROLIDONES

This application is a division of copending application, Ser. No. 742,517, filed July 5, 1968, now U.S. Pat. No. 3,519,565, which in turn is a continuation-in-part of application, Ser. No. 668,958, filed Sept. 19, 1967, now abandoned.

This invention relates to new polymeric compositions of matter suitable for use as lubricant additives. More particularly, it relates to oil-soluble interpolymers comprising about 0.5–40 parts by weight of units of the formula

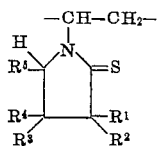

wherein each of $R^1$, $R^2$, $R^3$, $R^4$ and $R^5$ is individually hydrogen or a lower alkyl radical, and about 60–99.5 parts by weight of other polymeric units, at least part of said other polymeric units being alkyl carboxylate units in which the alkyl radicals have at least about eight carbon atoms.

It has been customary for some years to use additives in lubricating oils to impart a number of desirable properties to these oils. For example, additives may be incorporated into the oil to improve its viscosity properties, to disperse particles of sludge and varnish, to inhibit corrosion and oxidation, to depress the pour point, to improve extreme pressure properties, and the like. Many known additives serve only one of these purposes, but some of them serve several purposes at once.

A principal object of the present invention is to produce novel polymeric compositions of matter.

A further object is to produce oil-soluble polymers which are effective multi-purpose additives for lubricating compositions.

A still further object is to produce lubricant additives which serve as viscosity index improvers, dispersants and oxidation inhibitors.

Other objects will in part be obvious and will in part appear hereinafter.

The compositions of the present invention are characterized by the presence therein of polymeric units derived from an N-vinylthiopyrrolidone. The N-vinylthiopyrrolidone ring may contain lower alkyl groups, the term "lower alkyl" in the present application being intended to denote alkyl groups with four or less carbon atoms; but these polymeric units are preferably derived from unsubstituted N-vinylthiopyrrolidone, which has the formula

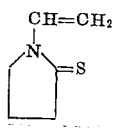

N-vinylthiopyrrolidone may be prepared by sulfurization of N-vinylpyrrolidone. The preferred sulfurization agent is phosphorus pentasulfide, $P_2S_5$. The reaction is generally run in a suitable solvent at a temperature of about 100°–150° C., as illustrated by the following example.

EXAMPLE 1

To a solution of 255 grams (2.3 equivalents) of N-vinylpyrrolidone in 500 grams of xylene and 550 grams of pyridine is added, with stirring, 123 grams (2.76 equivalents) of phosphorus pentasulfide. An exothermic reaction takes place and the temperature of the mixture rises to 50° C. The mixture is stirred under reflux at 120°–126° C. for one hour and cooled, whereupon it separates into two layers. The top layer is decanted and washed with dilute sodium hydroxide solution and water; the bottom layer is extracted with benzene, and the benzene extracts are washed with dilute sodium hydroxide and water and combined with the upper layer. The benzene solution is dried over magnesium sulfate, filtered and stripped at 80° C./15 mm. There is obtained 195 grams of crude N-vinylthiopyrrolidone which is recrystallized from methanol, ether and textile spirits to yield a product melting at 68.5°–69° C. The following analytical results indicate production of the desired compound.

Nitrogen: 10.9% (calc. 11.2%)
Sulfur: 25.0% (calc. 25.5%)

N-Vinylthiopyrrolidone can be interpolymerized with a number of monomers to form polymers having various properties. These monomers include esters of unsaturated alcohols such as allyl, vinyl and crotyl alcohol; vinyl cyclic compounds such as styrene, methylstyrenes and halostyrenes; unsaturated ethers such as such as ethyl vinyl ether; unsaturated ketones such as methyl vinyl ketone; unsaturated amides such as acrylamide, methacrylamide and N-(1,1-dimethyl-3-oxobutyl)acrylamide; unsaturated aliphatic hydrocarbons such as ethylene, propylene and the butenes; vinyl halides such as vinyl chloride and vinyl fluoride; esters of unsaturated polyhydric alcohols such as the butene-diols; unsaturated acids such as acrylic, methacrylic, crotonic and maleic acids; the anhydrides, acid halides and esters of these acids; unsaturated nitriles such as acrylonitrile and methacrylonitrile; and heterocyclic compounds such as N-vinyl-pyrrolidone and N-vinyloxazolidone.

An essential constituent of the compositions of this invention comprises polymeric units derived from an alkyl carboxylate wherein the alkyl radicals contain at least about 8 carbon atoms. These polymeric units may be produced by copolymerizing the N-vinylthiopyrrolidone with an unsaturated acid, acid chloride or anhydride such as acrylic acid, methacrylic acid, maleic anhydride, acrylyl chloride or the like to form a polymer with active acid groups, and subsequently esterifying this polymer by reaction with a suitable alcohol. Preferably, however, the N-vinylthiopyrrolidone is copolymerized with an ester such as decyl acrylate, lauryl acrylate, lauryl methacrylate, 2-ethylhexyl acrylate, or a $C_{12-14}$ dialkyl fumarate to form the desired copolymer directly. For the purposes of this invention, the copolymers contain about 0.5–40 parts by weight, preferably about 2–15 parts, of N-vinylthiopyrrolidone units and about 60–99.5 parts, preferably about 85–98 parts, of the alkyl carboxylate.

The invention also includes terpolymers, tetrapolymers, etc., which contain (in addition to N-vinylthiopyrrolidone and alkyl carboxylate units) units derived from other monomers of the types listed above. Preferably, these other units are derived from oxygen-containing monomers of which typical examples are methyl methacrylate, dibutyl fumarate, vinyl acetate, ethyl vinyl ether and methyl vinyl ketone. Such terpolymers, tetra-polymers and the like will ordinarily contain about 0.5–40 parts, preferably about 2–15 parts, of N-vinylthiopyrrolidone units; about 30–80 parts, preferably about 50–70 parts, of dialkyl carboxylate units wherein the alkyl radicals contain at least about eight carbon atoms; and about 10–60 parts, preferably about 25–40 parts, of units derived from other oxygen-containing monomers. In a particularly desirable tetrapolymer, said other monomer units consist of about 25–35 parts of vinyl acetate and about 2–10 parts of N-(1,1-dimethyl-3-oxobutyl)-acrylamide units.

The polymeric compositions of this invention may be prepared by interreacting the desired comonomers in the presence of a suitable free radical catalyst such as azobisisobutyronitrile, chlorate-sulfite, ammonium persulfate, etc. Most of the free radical catalysts known in the art are suitable with the exception of peroxides such as acetyl peroxide and benzoyl peroxide, which have been found to be ineffective for polymerizing N-vinylthiopyrrolidone. The polymerization reaction is generally carried out in bulk or in a suitable solvent, preferably a non-polar solvent such as hexane, heptane, chloroform, carbon tetrachloride, benzene, toluene, xylene, mineral oil or the like. Since the compositions are ordinarily employed as oil concentrates for use in lubricants, it is often particularly suitable to carry out the polymerization in a mineral oil such as white oil.

The polymerization may be effected at a temperature between about room temperature and 100°C., usually about 50°–90 C. Following polymerization, the solution may be filtered to remove solid by-products and any volatile solvent removed.

The preparation of the compositions of this invention is illustrated by the following examples. All parts are by weight.

EXAMPLE 2

To a solution of 254 parts of lauryl methacrylate and 64 parts of N-vinylthiopyrrolidone in 250 parts of toluene is added 3 parts of azobisisobutyronitrile. The mixture is heated to 62°C. under nitrogen and an exothermic reaction occurs which causes the temperature to rise to 68° C. The mixture is stirred at 60°–70° C. for three hours, and then 0.5 part of hydroquinone and 742 parts of mineral oil are added. The toluene is removed by vacuum distillation and the resulting 30 percent oil solution of the 80:20 copolymer of lauryl methacrylate and N-vinylthio-pyrrolidone is filtered. It contains 0.687 percent nitrogen and 1.66 percent sulfur.

EXAMPLE 3

Azobisisobutyronitrile, 1.5 parts, is added to a solution of 255 parts of lauryl methacrylate and 45 parts of N-vinylthiopyrrolidone in 700 parts of white oil. The solution is heated at 60°–67° C. under nitrogen for four hours, during which time it becomes quite thick and viscous. It is heated to 160° C./0.7 mm. to remove volatile components and filtered. The product, a 30 percent oil solution of an 85:15 (by weight) copolymer of lauryl methacrylate and N-vinylthiopyrrolidone, contains 0.491 percent nitrogen and 1.12 percent sulfur.

EXAMPLE 4

A 9:1 copolymer of lauryl methacrylate and N-vinylthiopyrrolidone is prepared by mixing 450 parts of lauryl methacrylate with 50 parts of N-vinylthiopyrrolidone and heating at 80°–88° C. under nitrogen while a toluene solution of azobisisobutyronitrile is added portionwise. A total of 3 parts of azobisisobutyronitrile is added, after which time the mixture is diluted with 1,167 parts of white oil, the toluene is removed by vacuum distillation and the product is filtered. A 30 percent solution in oil is obtained.

EXAMPLE 5

Following a procedure similar to that of Example 4, a 30 percent oil solution of a 95:5 (by weight) copolymer of lauryl methacrylate and N-vinylthiopyrrolidone is prepared.

EXAMPLE 6

Following the procedure of Example 3, a copolymer is prepared from 85 parts by weight of decyl acrylate and 15 parts by weight of N-vinylthiopyrrolidone.

EXAMPLE 7

A solution of 75 parts of a dialkyl fumarate wherein the alkyl groups contain 12–14 carbon atoms, 120 parts of vinyl acetate and 20 parts of N-vinylthiopyrrolidone in 40 parts of benzene is heated to 70° C., and a solution of 1.6 parts of azobisisobutyronitrile in 240 parts of benzene is added portionwise, with stirring. The reaction mixture is maintained under nitrogen during the reaction. When the polymerization is complete, 400 parts of mineral oil is added. The benzene is removed under vacuum and the residue is filtered and diluted with mineral oil to 25 percent. The product is a 40.6:48.6:10.8 (by weight) terpolymer of the dialkyl fumarate, vinyl acetate and N-vinylthiopyrrolidone.

EXAMPLE 8

Following the procedure of Example 7, a 30 percent solution in white oil of a 39.5:52:8.5 (by weight) terpolymer of dialkyl fumarate, vinyl acetate and N-vinylthiopyrrolidone is prepared from 70 parts of the fumarate, 100 parts of vinyl acetate and 15 parts of N-vinylthiopyrrolidone.

EXAMPLE 9

Following the procedure of Example 7, a terpolymer (30 percent solution in mineral oil) is prepared from 120 parts of dialkyl fumarate, 60 parts of vinyl acetate and 20 parts of N-vinylthiopyrrolidone. The composition of the polymer is 73.7:14.1:12.2 (by weight), respectively.

EXAMPLE 10

Following the procedure of Example 7, a terpolymer solution (30 percent in mineral oil) is prepared from 480 parts of dialkyl fumarate, 320 parts of vinyl acetate and 80 parts of N-vinylthiopyrrolidone. The polymer obtained is a 60.8:29.1:10.1 (respectively) terpolymer.

EXAMPLE 11

Following the procedure of Example 7, a terpolymer solution (30 percent in mineral oil) is prepared from 300 parts of dialkyl fumarate, 237.5 parts of vinyl acetate and 12.5 parts of N-vinylthiopyrrolidone. The polymer obtained is a 58.2:39.4:2.4 terpolymer.

EXAMPLE 12

Following the procedure of Example 7, a terpolymer solution (30 percent in mineral oil) is prepared from 300 parts of dialkyl fumarate, 225 parts of vinyl acetate and 25 parts of N-vinylthiopyrrolidone. The polymer obtained is a 60:35:5 terpolymer.

EXAMPLE 13

Following the procedure of Example 7, a tetrapolymer is prepared from 75 parts of dialkyl fumarate, 25 parts of dibutyl fumarate, 120 parts of vinyl acetate and 20 parts of N-vinylthiopyrrolidone in sufficient mineral oil to form a 30 percent solution of the polymer. The product is a 36.0:12.0:42.4:9.6 (by weight) tetrapolymer.

EXAMPLE 14

Following the procedure of Example 7, a 35 percent oil solution of a tetrapolymer of dialkyl fumarate, isooctyl fumarate, vinyl acetate and N-vinylthiopyrrolidone (28.2:9.4:54.9:7.5, by weight) is prepared from 75 parts of dialkyl fumarate, 25 parts of isooctyl fumarate, 160 parts of vinyl acetate and 20 parts of N-vinylthiopyrrolidone.

EXAMPLE 15

Following the procedure of Example 3, a 30 percent oil solution of an 85:15 (by weight) copolymer of 2-ethylhexyl acrylate and N-vinylthiopyrrolidone is prepared.

EXAMPLE 16

Following the procedure of Example 7, a terpolymer (30 percent oil solution) is prepared from 60 parts of 2-ethylhexyl acrylate, 35 parts of ethyl vinyl ether and 5 parts of N-vinylthiopyrrolidone.

EXAMPLE 17

A solution of 480 parts of the dialkyl fumarate of Example 7, 320 parts of vinyl acetate, 40 parts of N-(1,1-dimethyl-3-oxobutyl)acrylamide and 40 parts of N-vinyl-thiopyrrolidone in 100 parts of benzene is heated to 70°–80° C. and a solution of one part of azobisisobutyronitrile in 100 parts of benzene is added. The solution is maintained at 70°–80° C. for 7-½ hours; after each 1-¼ hours an additional portion of 0.33 part of azobisisobutyronitrile in 33 parts of benzene is added. At the end of five hours, a solution of 1 part of azobisisobutyronitrile in 100 parts of benzene is added. When the reaction is complete, the mixture is diluted with 1,400 parts of mineral oil and benzene is stripped under reduced pressure. The resulting solution is diluted with oil to a polymer concentration of 30 percent. The product is a tetrapolymer of the dialkyl fumarate, vinyl acetate, N-(1,1-dimethyl-3-oxobutyl)-acrylamide and N-vinylthiopyrrolidone in proportions of 57.9:32.5:4.8:4.8.

The polymers of this invention can be effectively employed in a variety of lubricating compositions based on diverse oils of lubricating viscosity such as natural or synthetic lubricating oils, or suitable mixtures thereof. The lubricating compositions contemplated include principally crankcase lubricating oils for spark-ignited and compression ignited internal combustion engines including automobile and truck engines, two-cycle engine lubricants, aviation piston engines, marine and railroad diesel engines, and the like. However, automatic transmission fluids, lubricants, gear lubricants, metal-working lubricants, hydraulic fluids, and other lubricating oil and grease compositions can benefit from the incorporation of the present polymers.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polymethylene glycol having a molecular weight of 500–1,000, diethyl ether of polypropylene glycol having a molecular weight of 1,000–1,500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suboric acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dicicosyl sebacate, the 2-ethyl-hexyl diester of linoleic acid dimer, the complex ester formed by reacting one mole of sebacic acid with two moles of tetra-ethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethyl-hexyl) silicate, tetra-(4-methyl-2-tetraethyl) silicate, tetra-(p-tert-butylphenyl) silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymer tetrahydrofurans, and the like.

In general, about 0.1–10.0 parts (by weight) of the polymer of this invention is dissolved in 100 parts of oil to produce a satisfactory lubricant. The invention also contemplates the use of other additives in combination with the products of this invention. Such additives include, for example, auxiliary detergents and dispersants of the ash-containing or ashless type, oxidation inhibiting agents, pour point depressing agents, extreme pressure agents, color stabilizers and antifoam agents.

The ash-containing detergents are exemplified by oil-soluble neutral and basic salts of alkali or alkaline earth metals with sulfonic acids, carboxylic acids, or organic phos-phorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-β-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200°C.

Ashless detergents and dispersants are illustrated by the acylated polyamines and similar nitrogen compounds containing at least about 54 carbon atoms as described in U.S. Pat. No. 3,272,746; reaction products of such compounds with other reagents including boron compounds, phosphorus compounds, epoxides, aldehydes, organic acids and the like; and esters of hydrocarbon-substituted succinic acids as described in U.S. Pat. No. 3,381,022.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, di-isobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphoro-dithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and N-hexyl alcohol.

Table I gives the compositions of five lubricants containing the polymers of this invention (Lubricants A–E), and two lubricants which do not contain the polymers of this invention (Lubricants F and G) for the sake of comparison.

TABLE I.—PARTS BY WEIGHT

| Ingredient | Lubricant | | | | | | |
|---|---|---|---|---|---|---|---|
| | A | B | C | D | E | F | G |
| SAE 10W-30 mineral oil base | 90.90 | 92.13 | 87.88 | 86.58 | 90.67 | 95.42 | 93.13 |
| Product of Example: | | | | | | | |
| 4 | 6.33 | 1.00 | | | | | |
| 10 | | | 9.35 | | | | |
| 12 | | | | 10.00 | | | |
| 17 | | | | | 5.93 | | |
| Pentaerythritol ester of polyisobutene-substituted succinic acid | 1.17 | 1.17 | 1.17 | 1.81 | 1.79 | 1.17 | 1.17 |
| Basic calcium petroleum sulfonate | 0.91 | 0.91 | 0.91 | 0.91 | 0.91 | 0.91 | 0.91 |
| Zinc salt of mixed isobutyl- and primary amylphosphorodithioic acids | 0.69 | 0.69 | 0.69 | 0.70 | 0.70 | 0.69 | 0.69 |
| Poly-(alkyl acrylate) | | 3.75 | | | | | |
| Terpolymer of $C_{12-14}$ dialkyl fumarate, ethyl vinyl ether and vinyl acetate | | | | | | | 3.75 |
| Copolymer of N-vinylpyrrolidone with lauryl methacrylate | | 0.35 | | | | | 0.35 |
| Silicone anti-foam agent | 0.003 | 0.003 | 0.003 | 0.004 | 0.004 | 0.003 | 0.003 |

The viscosity index-improving properties of the compositions of this invention are shown by the values given in Table II. These values for viscosity index are calculated according to ASTM method D2270-64.

TABLE II

| Lubricant | Viscosity, SUS | | Viscosity index |
|---|---|---|---|
| | 100° F. | 210° F. | |
| SAE 10W-30 mineral oil containing product of Example: | | | |
| 2 (1.5%) | 342 | 60.1 | 144 |
| (3.0%) | 501 | 93.5 | 145 |
| 3 (1.5%) | 348 | 72.6 | 147 |
| (3.0%) | 550 | 111.0 | 147 |
| 4 (1.5%) | 279 | 57.0 | 147 |
| (3.0%) | 389 | 72.9 | 179 |
| 5 (3.0%) | 341 | 63.7 | 155 |
| 7 (3.0%) | 297 | 60.3 | 159 |
| 8 (3.0%) | 264 | 54.9 | 140 |
| 9 (3.0%) | 294 | 57.5 | 141 |
| 10 (3.0%) | 360 | 63.6 | 145 |
| 14 (3.0%) | 254 | 54.1 | 140 |
| 17 (3.0%) | 310 | 60.0 | 149 |
| Lubricant: | | | |
| A | 336 | 63.8 | 159 |
| B | 340 | 67.3 | 176 |
| C | 330 | 61.8 | 150 |
| D | 306 | 59.4 | 148 |
| E | 341 | 62.9 | 151 |

The effectiveness of the compositions of this invention as oxidation inhibitors is illustrated by the results of a test in which a 350-ml. sample of a lubricant containing the additive being tested is heated at 300° F. for 96 hours in a 2-inch by 15-inch borosilicate tube. The lubricant base employed in the test is a Mid-Continent conventionally refined mineral oil having a viscosity of about 200 SUS at 100° F. Air is bubbled through the lubricant at the rate of 10 liters per hour; the oxidized sample is then cooled to 120° F. and is then filtered with suction through a double thickness of Whatman No. 1 filter paper.

The sludge deposit formed during the test is collected on the filter paper, washed with naphtha to a constant weight and reported as milligrams of sludge per 100 ml. of oil. Coagulated pentane and benzene insolubles and insoluble resins are determined on the filtered oil sample by ASTM method D893-60; a composite figure for total insolubles is determined by combining the weights of the pentane insolubles and the filterable sludge. The results of this test are given in Table III; the control is an oil sample which does not contain the composition of this invention.

TABLE III

| Sample | Filterable sludge mg./100 ml. | Coagulated pentane insolubles | Coagulated benzene insolubles | Total insolubles |
|---|---|---|---|---|
| Control | 999 | 0.256 | 0.019 | 1.380 |
| Control + 1.5% of product of Ex. 3 | 5 | 0.050 | 0.026 | 0.056 |

The effectiveness of the compositions of this invention as dispersants for lubricants is evaluated by means of the Ford modified "MS" Sequence V Test. In this test, a 1966 Ford 289 cubic inch displacement engine is run for 192 hours, with 4 cycles each of four hours duration being run each day until 48 cycles have been accumulated. Each cycle consists of stages I, II, and III as described in Table IV.

TABLE IV

| | Stage I | Stage II | Stage III |
|---|---|---|---|
| Time, min. | 45 | 120 | 75 |
| Speed, RPM. | 500 ± 25 | 2500 ± 25 | 2500 ± 25 |
| Load, lbs. | None | 137–139 | 137–139 |
| Oil sump temperature, ° F. | 120 ± 5 | 175 ± 5 | 205 ± 5 |
| Blowby rate, cfh | — | — | 150–180 |

At the completion of the test, the following evaluations are made: Engine sludge, engine varnish (rated on a scale of 0–50, with 0 being a heavy deposit and 50 being no deposit), and piston varnish (rated on a scale of 0–10, with 0 being a heavy deposit and 10 being no deposit). The results given in Table V were obtained by this method.

TABLE V

| | Lubricant | | | | |
|---|---|---|---|---|---|
| | A | B | C | F* | G* |
| Engine sludge | 48.0 | 48.4 | 49.4 | 46.3 | 41.4 |
| Engine varnish | 45.3 | 41.7 | 45.7 | 39.2 | 36.7 |
| Piston varnish | 9.2 | 7.9 | 9.2 | 8.2 | 7.2 |

*Does not contain the composition of this invention.

What is claimed is:
1. An oil-soluble copolymer comprising about 0.5–40 parts by weight of units of the formula

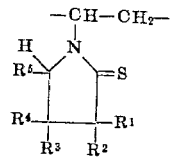

wherein each of $R^1$, $R^2$, $R^3$, $R^4$ and $R^5$ is individually hydrogen or a lower alkyl radical, and about 60–99.5 parts by weight of units derived from a polymerizable olefinically unsaturated alkyl carboxylate in which the alkyl radicals have at least about eight carbon atoms.

2. A copolymer according to claim 1 wherein each of $R^1$, $R^2$, $R^3$, $R^4$ and $R^5$ is hydrogen.

3. The copolymer of claim 2 wherein the polymerizable alkyl carboxylate is an alkyl acrylate or methacrylate.

4. A terpolymer comprising about 0.5–40 parts by weight of units of the formula

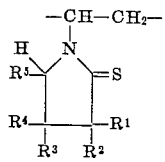

wherein each of $R^1$, $R^2$, $R^3$, $R^4$ and $R^5$ is individually hydrogen or a lower alkyl radical, about 30–80 parts of units derived from a polymerizable olefinically unsaturated alkyl carboxylate in which the alkyl radicals have at least about 8 carbon atoms, and about 10–60 parts of units derived from an olefinically unsaturated oxygen-containing monomer other than said alkyl carboxylate.

5. A terpolymer according to claim 4 which comprises about 2–15 parts of N-vinylthiopyrrolidone units, about 50–70 parts of $C_{12-14}$ dialkyl fumarate units and about 25–40 parts of vinyl acetate units.

6. A tetrapolymer comprising about 2–15 parts of units of the formula

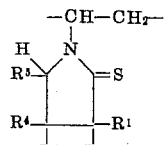

wherein each of $R^1$, $R^2$, $R^3$, $R^4$ and $R^5$ is individually hydrogen or a lower alkyl radical, about 50–70 parts of units derived from a polymerizable olefinically unsaturated dialkyl carboxylate wherein the alkyl radicals contain at least about 8 carbon atoms, about 25–35 parts of units derived from vinyl acetate and about 2–10 parts of units derived from N-(1,1-dimethyl-3-oxobutyl)acrylamide.

7. A tetrapolymer according to claim 6 wherein each of $R^1$, $R^2$, $R^3$, $R^4$ and $R^5$ is hydrogen and the dialkyl carboxylate units are derived from $C_{12-14}$ dialkyl fumarate.

* * * * *